United States Patent [19]

Taylor et al.

[11] 3,894,424
[45] July 15, 1975

[54] ON LINE PRESSURE TESTING SYSTEM

[75] Inventors: Harvey Carter Taylor, Decatur, Ga.; Whitney S. Powers, Jr., Pine City, N.Y.

[73] Assignee: The Coca-Cola Company, Atlanta, Ga.

[22] Filed: Apr. 16, 1974

[21] Appl. No.: 461,463

[52] U.S. Cl. .................. 73/49.2; 141/128; 134/152
[51] Int. Cl. ............................................. G01m 3/32
[58] Field of Search ....... 141/286, 295; 73/37, 37.6, 73/49.2; 134/131, 152, 166 R, 170, 171; 209/72–75, 79

[56] References Cited
UNITED STATES PATENTS

| | | |
|---|---|---|
| 978,154 | 12/1910 | Haller .................................. 141/295 |
| 2,314,310 | 3/1943 | Jackson et al. ........................ 73/37 |
| 3,387,704 | 6/1968 | Powers ................................. 209/73 |
| 3,448,743 | 6/1969 | Berry ................................. 134/152 X |
| 3,489,275 | 1/1970 | Powers ................................. 209/72 |
| 3,628,379 | 12/1971 | Babunovic ........................ 209/79 X |
| 3,650,146 | 3/1972 | Babunovic ............................. 73/37 |
| 3,751,973 | 8/1973 | Strauss et al. .................... 73/49.2 X |
| 3,771,649 | 11/1973 | Strauss ............................. 73/37 X |
| 3,805,594 | 4/1974 | Hayashi ............................. 73/49.2 |

*Primary Examiner*—Richard E. Aegerter
*Assistant Examiner*—Charles E. Phillips
*Attorney, Agent, or Firm*—W. Dexter Brooks

[57] ABSTRACT

A device for testing frangible containers such as glass bottles by internal hydrostatic pressure as they move along a conveyor. The device includes means for filling the containers with an incompressible liquid such as water, and means for subjecting the liquid in the containers to the hydrostatic pressure.

14 Claims, 8 Drawing Figures

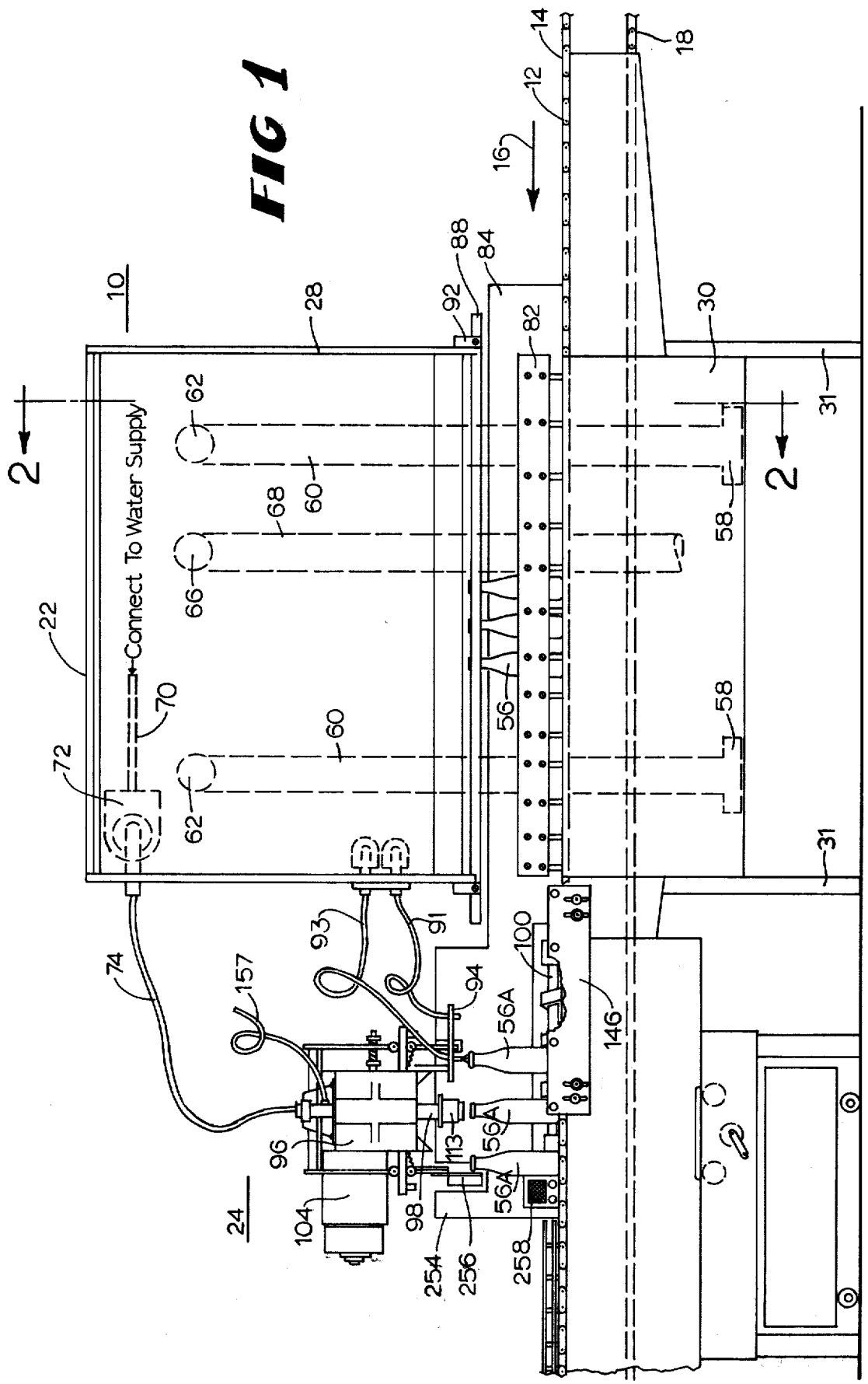

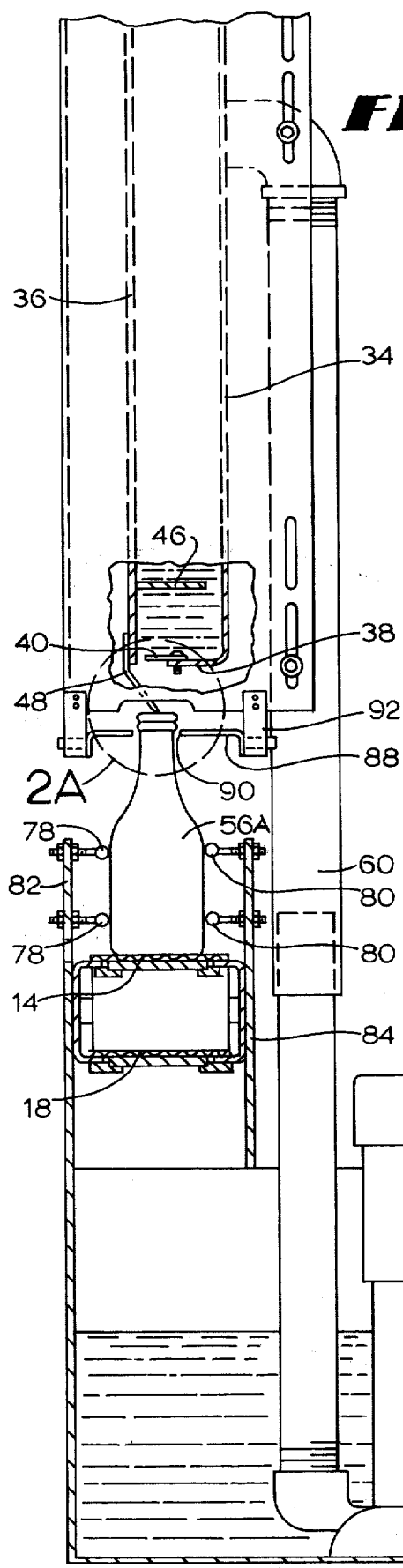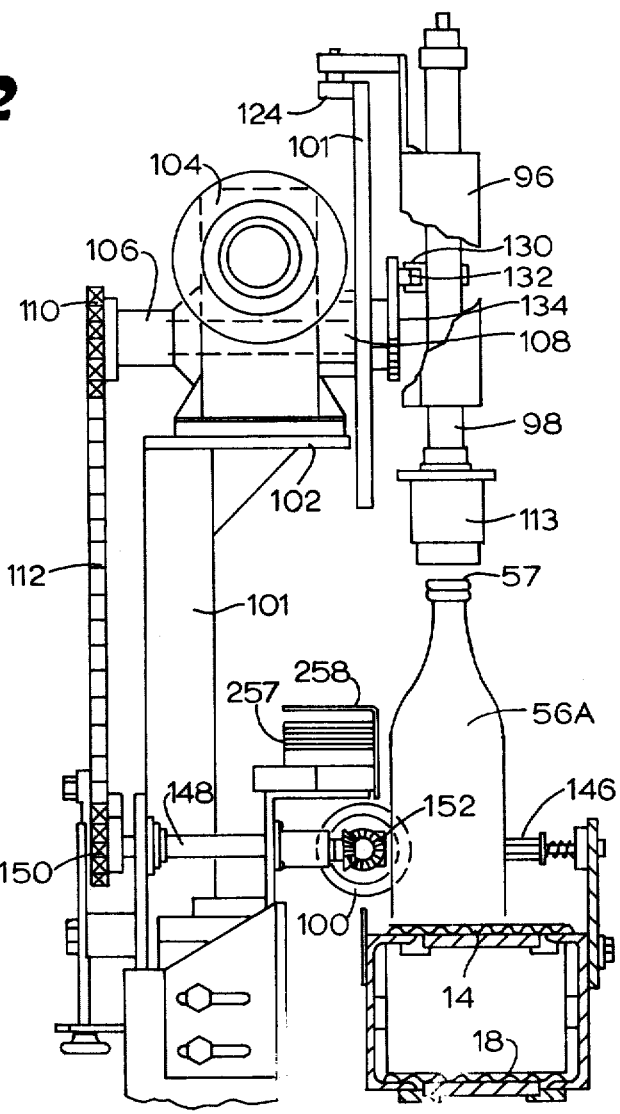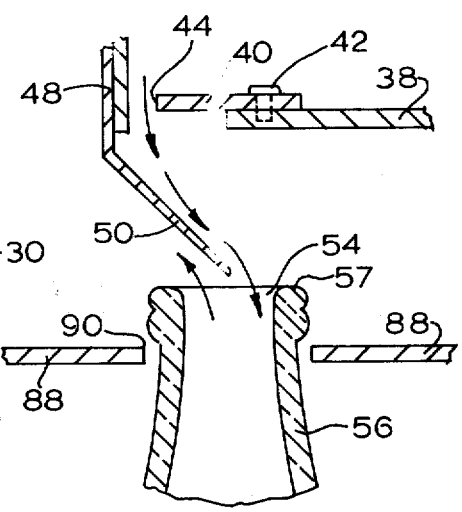

ON LINE PRESSURE TESTING SYSTEM

This invention relates to a system for automatic pressurization of bottles under hydrostatic force, for the purpose of testing the resistance of the bottle to internal pressure. The bottles enter the system and are conveyed past a filling apparatus which injects water into each bottle to its brimful capacity. Filled bottles are then engaged by a screw conveyor which spaces each bottle to the synchronous motion of a test head. The test head applies a downward force to the continuously moving bottle sealing surface, the force being sufficient to contain the hydrostatic pressure which is subsequently applied to the interior of the bottle after the seal is applied. Each bottle is then subjected to the prescribed internal hydrostatic pressure for a prescribed time interval, the source of the prescribed hydrostatic pressure being any convenient external pressure supply such as a high pressure water pump. Structurally deficient bottles will fail under such internal pressure while sound bottles will pass the test unharmed and will leave the system for further processing on the production line. Those bottles which break are detected by a photoelectric eye which is activated by the absence of a whole bottle. The signal from the photoelectric eye is used to activate a synchronously timed reject mechanism located beyond the test area which ejects broken glass fragments from the conveyor into a cullet collection bin.

This device is designed for installation adjacent a conveyor along which the bottles to be tested are continuously or intermittently moved. It is also designed to operate at speeds up to 180 bottles per minute while applying to each bottle any desired internal hydrostatic pressure. The advantages of the system are the elimination of weak bottles prior to filling with product, reliability, simplicity, ease of bottle handling, and elimination of previously required peripheral equipment such as star wheels, rotating tables, and large air compressors which require considerable floor space.

Heretofore most devices available for testing bottles on a production line have utilized compressed air as the pressure testing media, and have been limited to low test pressures due to the violent explosion, loud noise, and propelled glass fragments encountered when a glass container fails under high pneumatic pressures. The present device employs water as the test media and thus, allows higher testing pressures to be used since bottle failure owing to the incompressibility of water. Other devices are known which employ a hydrostatic test media although these devices are generally rotary in design and require much peripheral equipment, considerable floor space, and are generally quite complex thus requiring a full time operator and considerable maintenance. The present design handles bottles in a simple linear fashion and thus avoids the above design inadequacies.

It is the object of the present invention to provide a novel device for testing the ability of a bottle to withstand a prescribed internal pressure, without interrupting the straight line transportation of bottles through the production line, in which the bottles are tested under hydrostatic pressure such that the energy released upon bottle failure under such conditions is low due to the incompressibility of water, such that no protection between adjacent bottles is required.

It is another object of the present invention to provide a compact, reliable, and maintenance free method of filling each bottle to its brimful capacity prior to testing by means of a recirculating water system which cascades water over the bottles in a controlled manner such that each bottle is quickly filled.

Generally, the invention relates to a device for testing the strength of containers as they are transported along a conveying path. The device comprises means for filling the containers to their brims with a substantially incompressible liquid. It also comprises means for subjecting the liquid in each container to a predetermined hydrostatic pressure. A conveyor is provided for conveying the containers past the filling means and the pressure subjecting means.

The invention also relates to a device for substantially filling containers having relatively narrow mouths with a liquid as they are transported along a path under the influence of a conveyor. The device includes an elongated tank with a discharge opening that extends along the conveyor so that liquid can be discharged into the containers whereby the containers are substantially filled when said containers have traversed the length of said elongated discharge opening.

Further, the invention relates to a method for testing the bursting strength of a container moving along a conveying path comprising the steps of filling the container with a liquid as it moves along an upstream portion of the path, and then applying a high pressure to the liquid in the container at a downstream portion of said path.

Still further, the invention relates to a method of rapidly filling a plurality of containers with a liquid comprising the step of directing a stream of liquid into one side of the mouth of each container so that air can escape from the other side of the mouth.

The invention can best be described by referring to the accompanying drawings wherein a presently preferred form thereof is illustrated and wherein, FIG. 1 is a side elevation view of a device comprising the invention;

FIG. 2 is a sectional view taken along line 2—2 of FIG. 1;

FIG. 2A is a detailed view of a portion of FIG. 2;

FIG. 4 is a sectional view taken along line 4—4 of FIG. 3;

Figure 3:
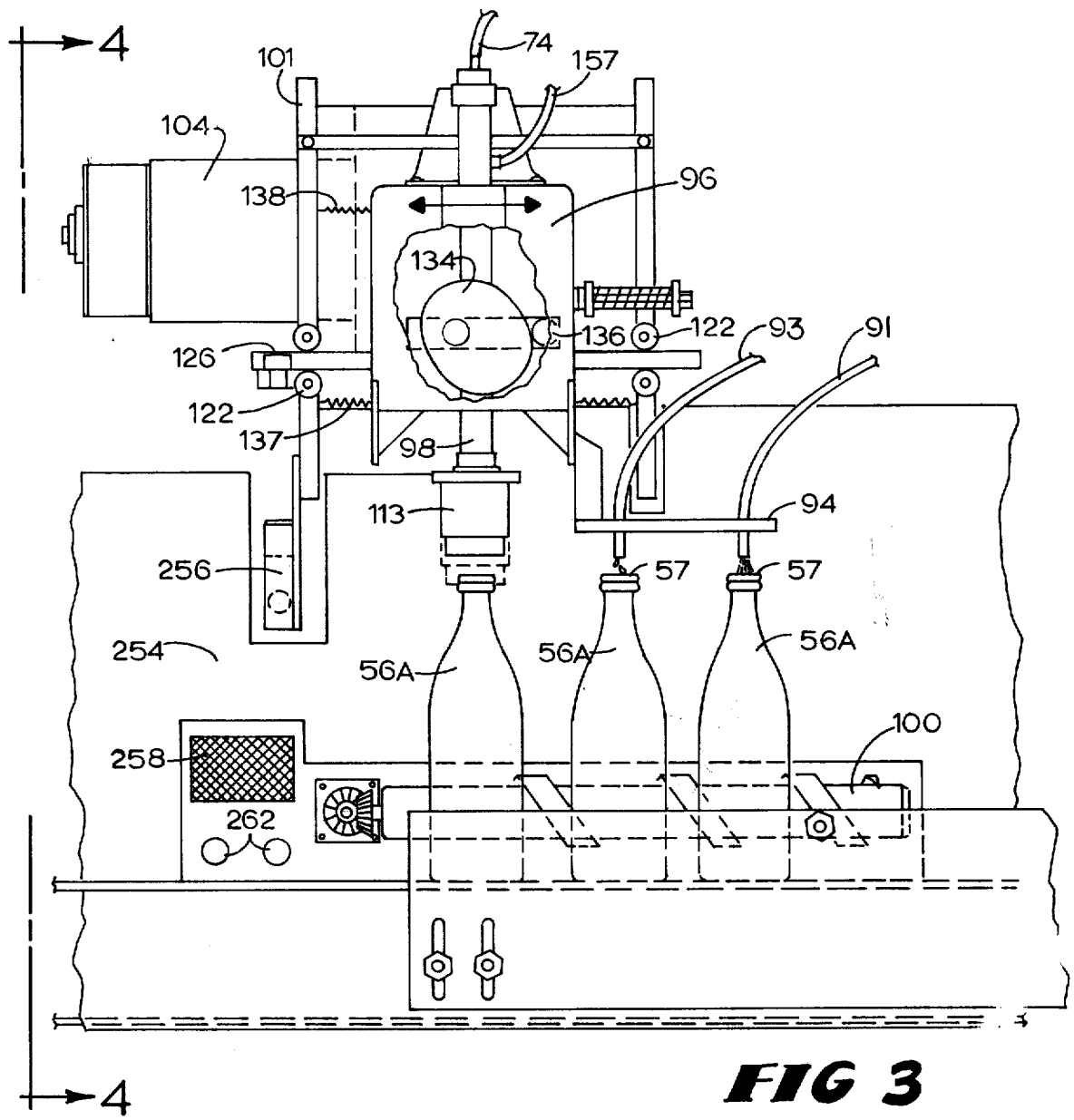
FIG. 3 is an enlarged side elevational view of a portion of the invention illustrated in FIG. 1.

The invention can best be described by referring to FIG. 1 where a device 10, constructed in accordance with a presently preferred form of the invention, is illustrated.

The device is arranged so that it can be placed along side an existing straight line conveyor 12 which is used to convey frangible containers, such as glass bottles, plastic or plastic coated bottles through a container making or a container filling plant. Typically, the conveyor 12 includes an endless flexible member which is comprised of a plurality of interconnected metal parts. The endless member has an upper flight 14 which moves containers supported thereon in the direction indicated by the arrow 16, and a return flight 18.

The device 10 comprises means 22 for filling the containers with a substantially incompressible liquid such as water and a means 24 for subjecting the liquid in the containers to a predetermined hydrostatic pressure.

The filling means 22 comprises a tank 28 which extends along the conveyor 12 and which is supported in overlying relation to flight 14 of the conveyor 12 by any convenient support. Immediately below the conveyor 12 and in vertical alignment with the tank 28 is a trough 30 for collecting liquid discharged from the tank 28 and which does not enter a container. The trough 30 may be supported on legs 31.

As best seen in FIGS. 1 and 2, tank 28 is an elongated member comprising spaced upright walls 34 and 36. A bottom wall 38 may be formed by bending the lower portion of wall 34 to substantially close the space between wall 34 and 36. An elongated plate 40 (FIG. 2A) which is supported on bottom wall 38 by fasteners 42 is adjustable so that the discharge opening 44 formed between the distal end of plate 40 and wall 36 can be varied. The discharge opening 44 is elongated and extends along the flight 14 of the conveyor 12.

A splash plate 46 is supported within the tank on wall 36. Plate 46 extends the entire length of the tank so that it overlies discharge opening 44. Elongated guide plate 48 which has one end secured to wall 36 near discharge opening 44 extends the entire length of the tank 28. The distal end 50 of plate 48 is angled downwardly and toward the mouth 54 of the containers 56 which are to be tested. See FIG. 2A.

Preferably, two centrifugal pumps 58 are located in the trough 30. Each of the pumps 58 is connected by way of a conduit 60 to an opening 62 in wall 34 at the upper end portion thereof. Energization of the pumps 58 causes liquid in the trough 30 to be recirculated into the tank 28.

Referring to FIG. 1, an overflow opening 66 in wall 34 is connected to one end of a conduit 68. The other end of conduit 68 is in the trough 30. Thus, the opening 66 prevents excessive water pressure build-up from occuring inside tank 28 when pumps 58 are fully energized.

Conduit 70 has one end connected to any available water supply and its other end connected to a high pressure pump 72. See FIG. 1. Pump 72 can be any presently available liquid pump provided that it can produce high pressure water required for testing the containers. Pump 72 may be mounted in any desired location on tank 28; pump 72 is connected to the hydrostatic pressure subjecting means 24 by a suitable flexible conduit 74.

As best seen in FIG. 2, the containers moving along the conveyor 12 are confined between guide members 78 and 80 which are supported respectively on guide plate 82 and splash guard 84. The guide members 78 and 80 are adjustably mounted on their respective plate 82 and guard 84 so that the containers can be positioned with their mouths 54 directly underlying the distal end 50 of plate 48. To this extent, guide plate 88 is provided. Plate 88 has an elongated slot 90 extending therethrough and is mounted immediately below the bottom of the tank 28 by bracket 92. Guide plate 88 decreases the likelihood of the containers rocking back and forth as they move along the conveyor. Such rocking is to be avoided since misalignment of the distal end 50 of the plate 48 with respect to the mouth 54 of the containers may result in the containers not being filled.

The filling means also includes elongated flexible conduits 91 and 93. As best seen in FIGS. 1 and 2, conduits 91 and 93 have one end connected to tank 28 which serves as a source of liquid. Suitable means may be provided to assure that conduit 93 discharges liquid at a very low rate and that conduit 91 discharges liquid at a faster rate, yet at a lower rate than the discharge rate through opening 44. Preferably this is achieved by selecting conduit 91 so that its diameter is larger than the diameter of conduit 93. The discharge outlets of each of the conduits 91 and 93 are supported in a bracket 94 which is connected to frame 96.

The means 24 for subjecting the liquid in the container to hydrostatic pressure comprises frame 96 which is supported for reciprocation along the conveyor 12. The frame 96 supports an elongated test member 98 which is supported on the frame 96 for vertical reciprocation toward and away from the containers. The means by which frame 96 and test member 98 are reciprocated will be discussed further herein. Such reciprocation is accomplished in a predetermined manner so that the sealing lip 57 of containers such as 56A will be engaged as they move along the conveyor 12. A screw conveyor 100 is provided for exactly spacing the containers to be tested and for synchronizing their movement along the conveyor 12 with the movement of frame 96 from right to left in FIG. 1.

The frame 96 is mounted downstream from the filling means 22 and in overlying relation to the bottles 56 by a structure which includes frame 101 (FIG. 4) which has a platform 102 on which is supported a motor 104. Rear and forward drive shafts 106 and 108 extend from the motor 104. The rear drive shaft 106 has a sprocket gear 110 fixed thereto for driving engagement with a timing chain 112. The frame 96 is guided by frame 101 for horizontal movement in the direction of movement of the conveyor 12 by rollers 122, 124 and 126 (FIG. 3).

The test member 98 is reciprocated vertically to engage the sealing lips 57 of the containers by a yoke 130 which is secured to test member 98 (FIG. 4), yoke slideably receives an actuating roller 132 which is mounted eccentrically on the face of cam 134. A cam follower 136 (FIG. 3) is fixed to the frame 96. The cam follower 136 may be a roller bearing which engages the peripheral surface of cam 134. Springs 136 and 138 are anchored to frame 96 at one end and are mounted to the frame 101 at their other end to urge frame 96 in the forward direction of travel so that the cam follower 136 bears against the periphery of cam 134. The frame is reciprocated back and forth in a horizontal direction by the action of the cam 134 against follower 136 and the bias of springs 137 and 138.

As explained in more detail in Powers U.S. Pat. No. 3,387,704, the configuration of the cam 134 causes the frame 96 and test member 98 supported thereby to move at a constant forward velocity during that portion of its movement when the test head 113 engages the sealing lip 57 of a container 56A.

The screw conveyor 100 is rotatably mounted at one side of the line of the conveyor 12. The convolutions of conveyor 100 are so spaced and have such a pitch as to maintain uniform spacing of the containers as they travel into position whereby lip 57 will be engaged by the test head 113. A spring loaded guide rail 146 maintains the containers in proper bearing engagement with the screw conveyor 100. Since the supporting surface of conveyor 12 is relatively friction free, when the containers are engaged by screw conveyor 100, there may be relative movement between the containers and the conveyor 12 if they do not have the same forward speed.

The screw conveyor 100 is rotated in synchronization with the rotation of cam 134 by the relationship of a cross shaft 148 having a sprocket 150 which is rotated from the sprocket 110 on drive shaft 106. Shaft 148 is connected to the screw conveyor 100 by bevel gearing 152. See FIG. 4. Accordingly, motor 104 becomes the common driving force for both the cam 134 and the screw conveyor 100.

Figure 6:
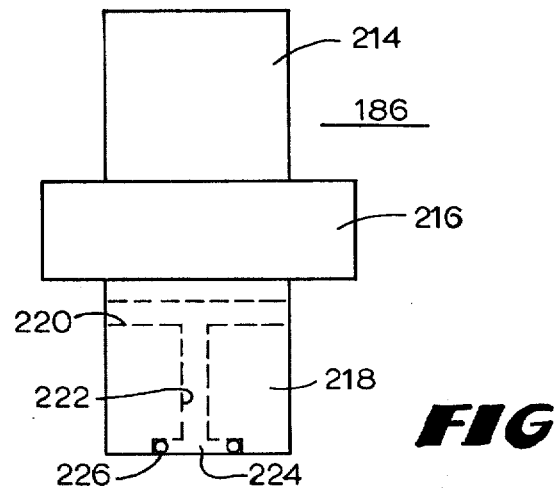
FIG. 6 is an elevation view of the valve illustrated in FIGS. 5 and 5A.
Figures 5, 5A:
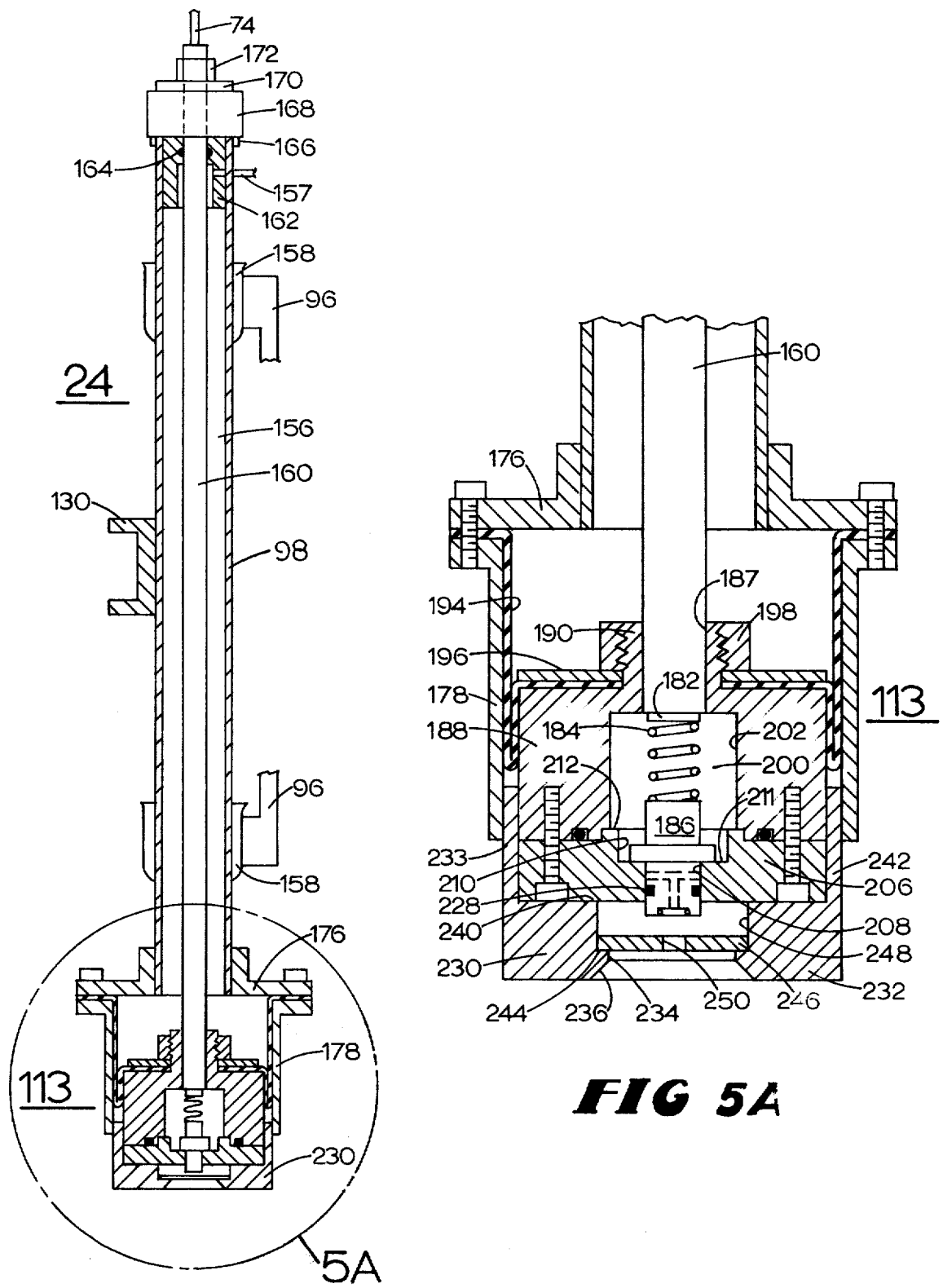
FIG. 5 is a side elevation view partially in section of a means for applying hydrostatic pressure to the containers.
FIG. 5A is a detailed view of a portion of FIG. 5.

The particular arrangement of the test member 98 and the test head 113 can best be described by referring to FIGS. 5, 5A and 6. Referring now to FIG. 5, the test member 98 comprises an elongated conduit 156 which is mounted in bearings 158 so that it is free to reciprocate vertically along its axis. The bearings 158 are supported by frame 96.

A second hollow conduit 160 is fixed within conduit 156 for movement therewith. At its upper end, conduit 160 is connected to flexible conduit 74 which in turn is connected to the high pressure pump 72. Thus, conduit 160 contains a column of water which is at the same pressure as that generated by pump 72.

An air tight seal is created between the upper ends of conduits 156 and 160 by way of flanged collar 162 and O-rings 164 which bear against the outer wall of conduit 160. The flanged collar 162 has a radially outwardly extending flange 166 which bears against the outer wall of conduit 156. A flexible conduit 157 is coupled to collar 162 and connects the interior of conduit 156 to a source of air at pressure which is above atmospheric pressure.

Immediately above the flange 166 is a shock cushion 168 which is retained in place by a plate 170 and a suitable fastener such as nut 172 which is threadedly received at the upper end of conduit 160. At its lower end, conduit 156 supports the test head 113 (FIG. 5A). This is accomplished by way of a flanged collar 176 which is connected by bolts to a flanged sleeve 178 which depends downwardly therefrom coaxial with conduit 156. The lower end of conduit 160 extends downwardly into the sleeve 178. At its lower end, conduit 160 has a hollow boss 182 which engages one end of a helical spring 184. The other end of the spring 184 is connected to reciprocable valve 186.

The lower end of conduit 160 is received in an aperture 187 on boss 190 which extends from a valve body 188. The valve body 188 has a chamber 200 which is defined by peripheral sidewall 202. The chamber 200 contains the spring 184 and the valve 186.

A flexible diaphragm 194, which may be made of any suitable material, has a central opening. The central opening of diaphragm 194 surrounds boss 190. The outer periphery of diaphragm 194 is secured between the flanges on collar 176 and sleeve 178. The diaphragm 194 is retained in place around the boss 190 by diaphragm plate 196. Diaphragm 194 has a central aperture so that it can be slipped over boss 190 and retained by a threaded fastener such as nut 198 threadingly received on the boss 190.

The lower face of the valve body 188 is coupled to a valve seat plate 206 by a plurality of screws. The valve seat plate 206 includes an aperture 208 counterbored at 210 to define ledge 211 formed therebetween.

The ledge 211 functions as a limit stop for the valve 186. A raised boss 212 is provided on the periphery of counterbore 210 to assist in seating the valve seat plate 206 on one end of the valve body 188.

As best seen in FIG. 6, valve 186 comprises an upper cylindrical portion 214 above an enlarged peripheral flange 216. A lower cylindrical portion 218 depends from flange 216. Portion 218 may have a plurality of horizontally extending flow passages 220 which are coupled to a vertically extending flow passage 222. Flow passage 222 has an opening in the bottom face of cylindrical portion 218. If desired, the bottom face may be recessed as at 224 and fitted with a sealing ring 226.

As best seen in FIG. 5, the upper cylindrical portion 214 is engaged by the spring 184 while lower portion 218 fits snugly in aperture 208. In order to assure that there can be no passage of liquid between the portion 218 and the wall of aperture 208, a sealing ring 228 is provided in a recess on outer periphery of the lower portion 218.

The valve seat plate 206 is in engagement with a bottle guide head 230. The bottle guide head 230 is generally cup shaped and has a horizonatally disposed radially inward extending portion 232 and an upwardly extending peripheral wall 233. Peripheral wall 233 extends upwardly between valve body 188 and sleeve 178. An aperture 234 through portion 232 is defined in part by downwardly and outwardly diverging walls 236. A first circumferential ledge 240 is formed at the juncture of portion 232 and peripheral wall 233. The upper surface of ledge 240 bears against the lower surface of the valve seat plate 206. A second circumferential ledge 244 is formed on the upper surface of portion 232 adjacent aperture 234. A valve operator 246 is supported by ledge 244. The valve operator 246 may be a relatively flat disc which has a centrally disposed aperture 250. Aperture 250 is in alignment with a flow passage 222 in the valve 186. The valve operator 246 is capable of rocking when it is reciprocating within the space defined between the bottom surface of the valve body 188 and ledge 244 so as to accomodate bottles having a "tilt" finish.

When the test member and test head are assembled, a column of air is trapped between the outer diameter of conduit 160 and the inner diameter of conduit 156. Since the column of air is at a pressure that is higher than atmospheric pressure, the diaphragm 194 and its plate 196 are urged downwardly. Conduit 160 which is connected to pump 72 by way of conduit 74 enables liquid to enter chamber 200 of the valve body 188 and to raise the pressure of the liquid therein to the pressure generated by the pump 72.

With the foregoing in mind, the operation of the device can now be described. The tank 28 and trough 30 are placed above and below the conveyor 12 at the location where testing is to be conducted. The means 24 for subjecting the container to the hydrostatic pressure is then positioned immediately adjacent and downstream from the tank 28 and trough 30, as illustrated in FIG. 1.

Energization of the centrifugal pumps 58 causes tank 28 to be filled to a sufficient extent so that the test liquid, such as water, is discharged therefrom through opening 44. The liquid moves along the distal end 50 of plate 48 whereby it is directed into one side of the open mouth 54 of each of the containers 56A passing by on the conveyor 12. Guide members 78 and 80 are adjusted in order to assure that the mouths 54 are properly positioned with respect to the flow of water leaving the tank 28. Such positioning can be fairly accurately determined because a relatively constant pressure head can be achieved in tank 28 by virtue of overflow aperture 66 which prevent excessive water pressure build-up from occuring inside tank 28 when pumps 58 are fully energized.

It is contemplated that the containers will be moved by conveyor 12 in the direction indicated by arrow 16 beneath the tank 28. The containers are filled to their tops with liquid as they move along discharge opening 44. In one working embodiment of the invention, large soft drink bottles were filled to within about an inch of their lips 57 brims after they had traversed the entire length of plate 48. It is unlikely that the containers could be filled to their lips 57 by tank 28 since some liquid will be splashed, and the forceful filling action of tank 28 creates foaming in the containers which requires time to subside.

Upon leaving the area of tank 28, the bottles are engaged in the convolutions of the screw conveyor 100. As explained earlier, the screw conveyor 100 is synchronized with the test member so that the bottles are spaced and can receive additional water, first from flexible conduit 90 and second from flexible conduit 92 so that they are filled to their lips 57 before they are engaged by the test head 113.

The reciprocating frame 96 and test member 98 are designed, as explained earlier, so that during a portion of the forward movement of the test member, their speed is identical to that of a container passing below it. Then the test head 113 is lowered so that it can seal the mouth 54 of the container to be tested.

As the test member 98 moves down, the container mouth 54 is engaged by bottle guide 230 which directs the sealing lip 57 against valve operator 246. The valve operator 246 seals the mouth 54 and pushes valve 186 upwardly into chamber 200 of the valve body 188. To some extent, the impact of the mouth 54 against the valve operator 246 is cushioned by the column of air in conduit 156. Further cushioning is accomplished by the shock cushion 168 which is located at the top of conduit 156. The primary purposes of the diaphragm 194, which is pressurized to about 30–40 psi, is to provide a vertical sealing force in addition to that supplied by the spring 184 so that an effective seal is made between the bottle lip 57 and valve operator 246.

When the valve 186 is raised, the high pressure liquid in chamber 200 of the valve body is now connected by way of flow passages 220 and 222 to the liquid in the container being tested. A water tight seal between the valve 186 and the valve operator 246 is accomplished by sealing ring 226.

It is preferred that the liquid be at a pressure of about 200 to 300 pounds per square inch. This pressure is readily transmitted to the container being tested by merely opening valve 186. After this test head 113 separates from contact with the container sealing lip 57, the valve 186 returns to its closed position under the force of spring 184 to prevent test liquid from being discharged from the test head 113.

In the event that a structurally deficient bottle is encountered, it will fail under the hydrostatic pressure. However, because liquid is the test medium there will not be a loud noise nor will there by flying container parts.

As best seen in FIG. 3, means for detecting broken containers is provided in the form of an optical detector 256 which can detect the absence of a container or a portion of a container moving past reject station 254. The detection means 256 and the means for removing the broken containers are synchronized with the test member 98 and screw conveyor 100. Upon detecting the absence of a container at the reject station when the synchronizing means indicates that a container should be present, a solenoid 256 is energized. The solenoid pushes a plate 258 outwardly (FIG. 3) to push the broken containers off the conveyor. At the same time, a pressurized air is discharged from ports 262. The sum of these devices is to clear the conveyor 12 of any container which fails under the test pressure. The broken container parts may be collected in a cullet collection bin. The aspects of the device relating to the detection and removal of container which fail have not been described in detail as they form no part of the present invention and are well documented in the prior art.

The apparatus is particularly suited for pressure testing bottles in a plant or factory where they are moving along a conveyor in single file. Up to about 180 bottles per minute can be moved passed the test head 98. Further, in view of the fact that liquid is used as the test medium, failure of bottles does not result in a high danger to personnel from flying glass parts or from the loud noises associated with bottle failure.

While the invention has been described with reference to one particular form thereof, it is apparent that many other forms and embodiments will be obvious to those skilled in the art in view of the foregoing description. Thus, the scope of the invention should not be limited by that description, but, rather only by referring to the claims which are appended hereto.

What is claimed is:

1. A device for testing the strength of containers as they move along a conveying path comprising means for filling the containers to their top capacity with a substantially incompressible liquid, means for subjecting said incompressible liquid in the container to a predetermined hydrostatic pressure, said subjecting means being disposed downstream of said filling means, a conveyor, said conveyor being disposed below said filling means and said subjecting means for supporting and conveying containers thereon past said filling means and said subjecting means, wherein said filling means includes an elongated member that extends along the conveying path, said elongated member having an elongated opening extending along said conveying path through which a downwardly directed sheet of liquid can be simultaneously discharged into a plurality of containers as they are moved by said conveyor past said member so that the containers are substantially filled thereby.

2. A device as defined in claim 1 wherein said member is a tank defined by a plurality of walls, said elongated opening being disposed in one of said walls, and means for directing the liquid flowing from said tank through said discharge opening into a portion of the mouths of each container so that trapped air can escape from the container through the other portion of the mouth to enable the container to be rapidly filled to its top capacity.

3. A device as defined in claim 2 wherein said flow directing means is a downwardly and angularly directed elongated plate extending along said flow path.

4. A device as defined in claim 1 including a means for collecting the liquid discharged from said member and not entering said containers, said member being disposed over said conveyor, said collecting means being disposed below said conveyor, and means for returning liquid from said collecting means to said member.

5. A device as defined in claim 4 wherein said returning means includes at least one conduit, and means for conveying liquid through said conduit from said collecting means to said member.

6. A device as defined in claim 1 wherein said conveyor includes a portion which is operative to move the containers past said subjecting means at a predetermined speed, said subjecting means including a test head for engaging the mouths of the containers, and means for reciprocating said test head toward and away from the containers and for reciprocating said test head longitudinally along said conveying path, means for interconnecting said portion of said conveyor to said means for reciprocating said test head so that as the containers move past said test head, said test head is moved along said conveyor at the same speed as said containers, and said test head is lowered to engage the mouth of each container and to apply the predetermined pressure to the liquid in said container.

7. A device as defined in claim 6 wherein said means for filling said containers comprises a tank, said tank having an elongated discharge outlet that extends along the conveying path for substantially filling the containers to be tested, said filling means further comprising another filling member, said other filling member being coupled to said subjecting means for longitudinal reciprocation therewith for further filling the containers, and said other filling member is a substantially flexible conduit that has one end connected to a supply of liquid.

8. A device as defined in claim 7 wherein said means for filling containers comprises a second filling member, said second filling member being coupled to said subjecting means between said test member and said other filling member for longitudinal reciprocation therewith for completely filling the containers, said second filling member being a substantially flexible conduit that has one end connected to a supply of liquid, and the rate at which liquid is discharged by said second filling member is less than the rate at which liquid is discharged by said first filling member so that liquid is not splashed out of the top of said containers.

9. A device as defined in claim 8 wherein each of said flexible conduits are connected to said tank.

10. A device as defined in claim 1 including a source of high pressure liquid, a conduit connecting said high pressure source to said subjecting means, a valve in said subjecting means, means for biasing said valve to a normally closed position, said valve being opened in response to engagement of the mouths of the containers by said subjecting means so that the container receives said high pressure liquid.

11. A device as defined in claim 10 wherein said source of high pressure liquid is a pump, the inlet of said pump being coupled to said means for filling the containers, and the outlets of said pump is connected to said conduit.

12. A device as defined in claim 11 wherein said pump has a capacity of at least about 200 pounds per square inch.

13. A device as defined in claim 1 wherein said subjecting means comprises an elongated conduit, a valve body, said body having an end wall with an aperture therethrough and a downwardly extending peripheral wall, a valve seat adjacent said peripheral wall and having an aperture therethrough, a valve means for urging said valve against said valve seat to its normally closed position, and means for moving said valve to its open position so that liquid in said conduit is connected to liquid in the containers to be tested.

14. A device as defined in claim 13 wherein said valve includes an elongated portion disposed in said aperture, an enlarged portion coupled to said elongated portion and normally resting on said valve seat, and said valve has at least one longitudinally directed conduit which is coupled to at least one radially directed conduit, and said radially directed conduit and said longitudinally directed conduit are in said elongated portion so that when said valve is in its normal position, said conduits are sealed by the wall defining said aperture in said valve seat.

* * * * *